United States Patent [19]

Pate

[11] 4,385,327
[45] May 24, 1983

[54] AUDIO SYSTEM HAVING A TIME BASE ERROR CORRECTION ARRANGEMENT

[76] Inventor: John M. Pate, 3704 Inglewood Cir. South, Nashville, Tenn. 37216

[21] Appl. No.: 251,712

[22] Filed: Apr. 6, 1981

[51] Int. Cl.³ .............................. G11B 5/43; G11B 5/02
[52] U.S. Cl. .......................................... 360/27; 360/28; 360/29
[58] Field of Search .................. 360/27, 73, 28, 29

[56] References Cited
U.S. PATENT DOCUMENTS

| | | | |
|---|---|---|---|
| 3,347,997 | 10/1967 | Woodrutt | 360/27 |
| 3,483,540 | 12/1969 | Damron | 360/27 |
| 3,803,630 | 4/1974 | Belcher et al. | 360/27 |
| 3,982,277 | 9/1976 | Naylor | 360/27 |
| 4,184,178 | 1/1980 | Rotter et al. | 360/27 |

Primary Examiner—Vincent P. Canney
Attorney, Agent, or Firm—Cushman, Darby & Cushman

[57] ABSTRACT

A system for reproducing and/or transmitting analog audio information is disclosed which provides for the correction of time base errors. An inaudible pilot signal accompanies the audio information. Correction circuitry examines the frequency and phase characteristics of the pilot signal to develop signals for effecting correction of the errors.

8 Claims, 3 Drawing Figures

AUDIO SYSTEM HAVING A TIME BASE ERROR CORRECTION ARRANGEMENT

BACKGROUND OF THE INVENTION

The present invention relates to an arrangement for effecting corrections of time base errors present in reproduced and/or transmitted audio information of the analog type.

For purposes of explanation, reference will be made to errors of the sort which are associated with reproductions from mechanical recording devices. Typically, such errors are in the form of speed, flutter and multichannel delay errors.

An example of speed error would be the playback of a magnetic tape at a speed slightly faster or slower than the speed at which it was recorded. This could be the result of rotational speed error of the capstan motor, incorrect capstan diameter (due to wear, for example), or slippage between the magnetic tape and the capstan due to an imbalance of tape tension. Speed error results in a change of pitch in a recording as it is played back. A speed error of as little as 0.1% can result in a change of pitch detectable to a trained musician. A speed error of 1% results in a noticeable pitch change. Speed error also causes a recording to play back over a different period of time. For example, a recording that was made over a period of 60 minutes would play back over 59 minutes and 24 seconds, in the case of a 1% error.

Flutter is a form of speed error and is an alternatingly increase and decrease in instantaneous speed at a cyclic rate, typically between 2 and 10 Hz. Flutter results from mechanical imperfections of all recording devices. A capstan that is not perfectly round (elliptical) will cause flutter in a magnetic tape recorder. Mechanical "play" in bearings and drive motors with non-uniform torque are other examples of sources of flutter. The primary objection to flutter is its audible effect which, in severe cases, sounds like a "fluttering" or vibrato sound. Flutter is measured by recording a pure tone and then measuring the frequency modulated component of the tone upon playback. A weighting curve is usually applied which takes into account the psychoacoustic effect of the flutter rate and the result is expressed in a percentage. Typical flutter measurements for professional tape machines vary from about 0.03% to 0.15%.

Delay in error is a problem associated with recording devices (normally magnetic tape recorders) which have more than one audio channel or "track". Mechanical imperfections, such as an error in tape head azimuth, can cause the playback of one or more channels to lead or lag a reference channel in time. Tape skew is another potential source of this error. Delay error is seldom more than 300 microseconds and usually is of no consequence until two or more tracks are electrically mixed. If both tracks contain components of the same audio signal, a nulling of this signal will result at a frequency whose period is equal to twice the delay error and at integral multiples of this frequency. For example, assume that a stereophonic (two track) tape machine has a delay error of 50 $\mu$s. If the outputs of this machine are electrically mixed to form a monaural (one channel) signal, elements of the audio which are present on both the original two tracks at about the same level will cancel each other in the vicinity of 10 kHz. This is because 50 $\mu$s corresponds to 180° of phase at 10 kHz. This effect is particularly troublesome in the field of FM broadcasting. In this case, a significant number of listeners are listening to stereo broadcasts on monaural receivers and are hearing the electrical sum of both stereo channels. Delay error is not audible to the stereo listener but the monaural listener hears a very degraded high frequency response of the center channel components of the audio.

In the past, efforts have been made to minimize time base errors in audio equipment. An example is the arrangement for automatic alignment of the record head azimuth for least delay error for a magnetic tape recording and reproducing machine which is disclosed in U.S. Pat. No. 4,101,937, issued to John P. Jenkins on July 18, 1978. This known arrangement employs audible tones which must be erased before audio is recorded on the cartridge. Such a system corrects only for delay error contributed by the record head and only as that error is measured by the playback head of that same machine. It is not a real time continuous correction system which corrects for any error, regardless of source, each time the tape is played.

SUMMARY OF THE INVENTION

The present invention provides time base corrections by means of an inaudible pilot signal which is recorded (or transmitted) at a low level along with the analog audio information. At the output of the reproducer (or at the receiver in the case where the information is transmitted), the pilot signal is extracted and decoded. The information derived as a result of the decoding is used as a reference for time base correction of the audio signal.

Details of the invention now will be discussed in connection with the accompanying drawings wherein.

DETAILS OF THE INVENTION

For purposes of disclosing the invention in detail, reference primarily is directed to its incorporation in an analog recorder/reproducer system. However, the invention also may be employed in a system which transmits audio information. Consequently, in the discussion to follow, parenthetical expressions are utilized at appropriate points referring to the latter type of system.

Figure 1:
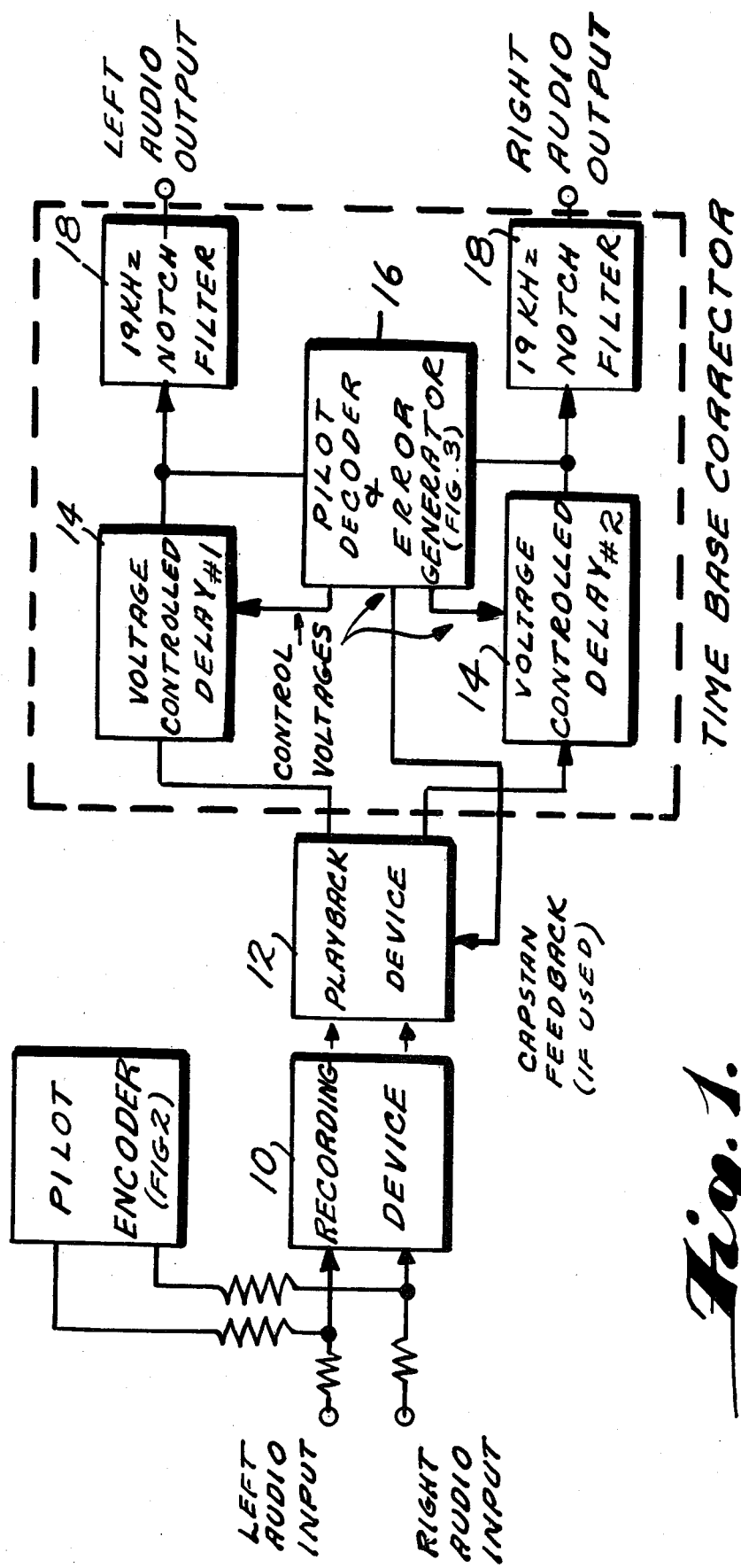
FIG. 1 is a block diagram of the invention as incorporated with an analog audio recorder/reproducer.

In FIG. 1, there is illustrated a recorder/reproducer which comprises a recording device 10 and a playback device 12. Input to the recording device 10 is supplied from separate sources. As indicated in the drawing, these sources include left and right audio inputs which designate that the recording is to be done in separate channels as, for example, on a magnetic tape in device 10. The left and right audio inputs may be from various sources, such as separate microphones. Additionally, the recording devide is supplied with an inaudible pilot signal which is recorded in each of the channels of device 10. The pilot signal will be described in detail hereinafter in connection with the discussion of FIG. 2.

During reproduction, the information recorded on device 10 is directed by playback device 12 to a time base corrector which includes voltage-controlled delays 14 for each of the channels of reproduced information. As in the case of all the circuit components which are illustrated in block diagram form in this disclosure, the delays 14 are conventional circuits well known to those of ordinary skill in the art and commercially available from a variety of sources.

The outputs of delays 14 are applied to a pilot decoder and error generator 16. As will be described in detail in connection with FIG. 3, the circuitry arrangement 16 extracts time base information from the pilot signal. This information is utilized to develop error correction signals. In the case of flutter and multichannel delay error, the error correction signals are fed back to the voltage-controlled delays 14 to alter their delay periods thereby effecting corrections. In the case of speed error, the appropriate correction signal developed by the pilot decoder and error generator 16 is utilized to regulate capstan motor speed thereby correcting the error.

The outputs of the delay circuits 14 also are passed through respective notch filters whereby the pilot signal information is eliminated as the recorded information passes to left and right audio outputs from the system.

The overall structure and operation of the invention having been described, details thereof now will be presented.

The pilot signal which is employed takes the form of a 19.000 kHz carrier which is 65% amplitude modulated by a 296.875 Hz sine wave. The pilot is recorded (or transmitted) at a level of $-25$ dbVU along with the audio signal. There is nothing inherent in the invention that requires these specific parameters. For example, 20 kHz could be used for the carrier, 80% could be used as the modulation level, 400 Hz could be the modulating frequency and $-30$ dbVU could be the injection level, with equal results. The parameters of the preferred embodiment of the invention were chosen to simplify the design and operation of the system. The carrier frequency was chosen so as to be supersonic but not so high in frequency that it would not be easily recordable on any tape recorder normally in use at a broadcast station. The specific frequency of 19.000 kHz was chosen to prevent an audible heterodyne from occurring in the event that slight leakage occurred through to the stereo generator of an FM broadcast station which also uses a 19 kHz pilot. The modulating frequency was chosen because it is 1/64th of the carrier frequency and therefore easily and precisely generated by a divider. The frequency is high enough to resolve accurate delay information yet low enough that the lower sideband produced by modulation, while lower than the carrier, is still supersonic. The modulation depth is not critical and reliable results are obtained anywhere from 50% to 75%. A modulation level of higher than 75% is not used to simplify the process of regenerating the 19 kHz carrier. The pilot injection level of $-25$ dbVU was selected after tests were made to determine the minimum pilot signal needed for proper operation of the correction unit, and the maximum level possible before modulation noise caused a measurable increase in noise floor.

Figure 2:
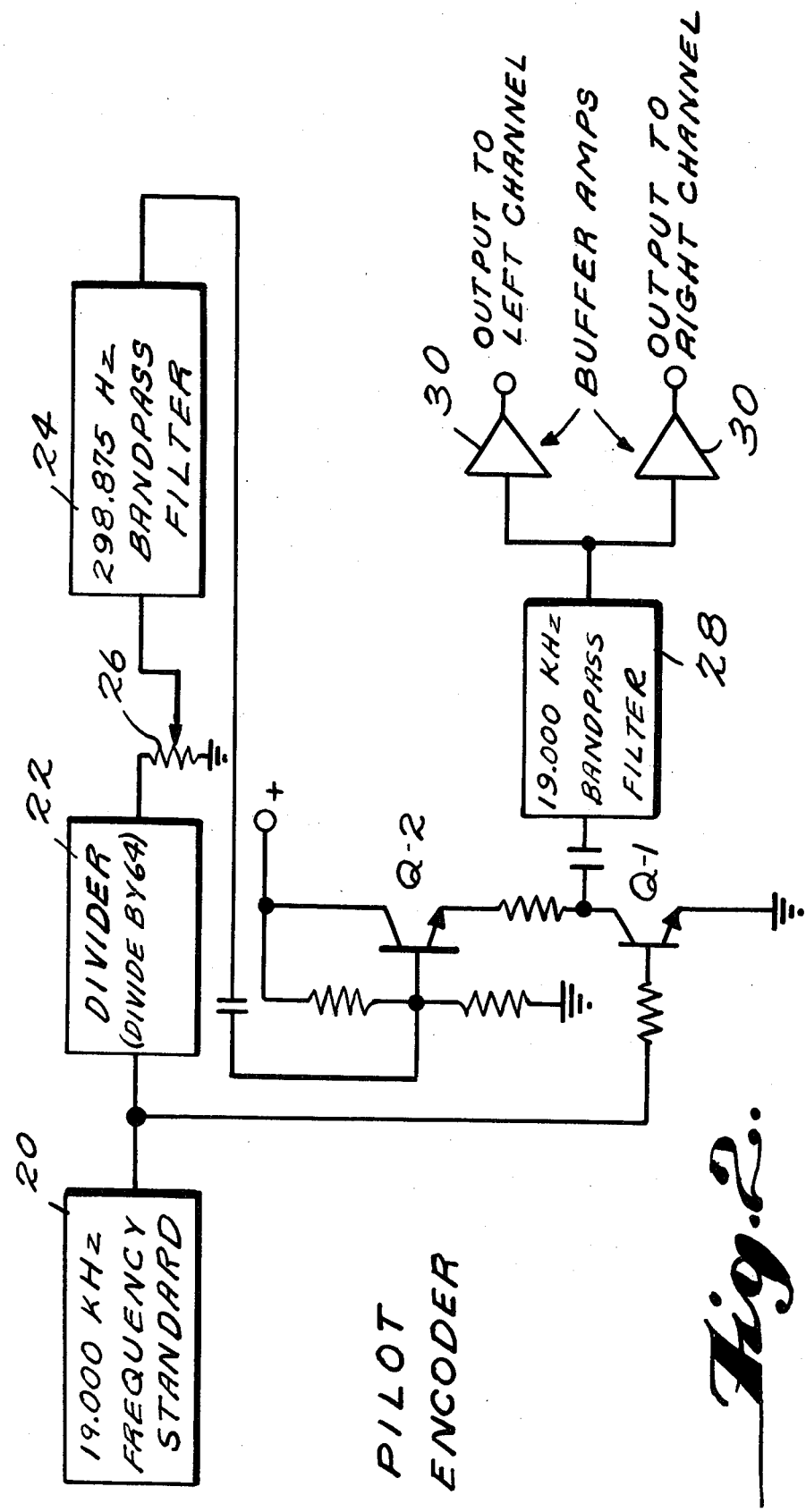
FIG. 2 is a block diagram of details of the pilot encoder forming a portion of FIG. 1.

A block diagram of the encoder is shown in FIG. 2. A 19.000 kHz frequency standard 20 is fed to both a switching transistor (Q-1) and to a divider 22 to obtain a 296.875 square wave. This is fed to a 296.875 Hz bandpass filter 24 to obtain a 296.875 Hz sine wave which then is fed to modulating transistor Q-2. The modulation is set to 65% with a potentiometer 26. The output of the modulated stage then is fed to a 19 kHz bandpass filter 28 which passes the carrier and both sidebands and rejects 296.875 Hz leakage and harmonics of 19 kHz. The bandpass filter output then is fed to a mixing network (not shown) and on to the audio input connections of the recorder (FIG. 1).

Figure 3:
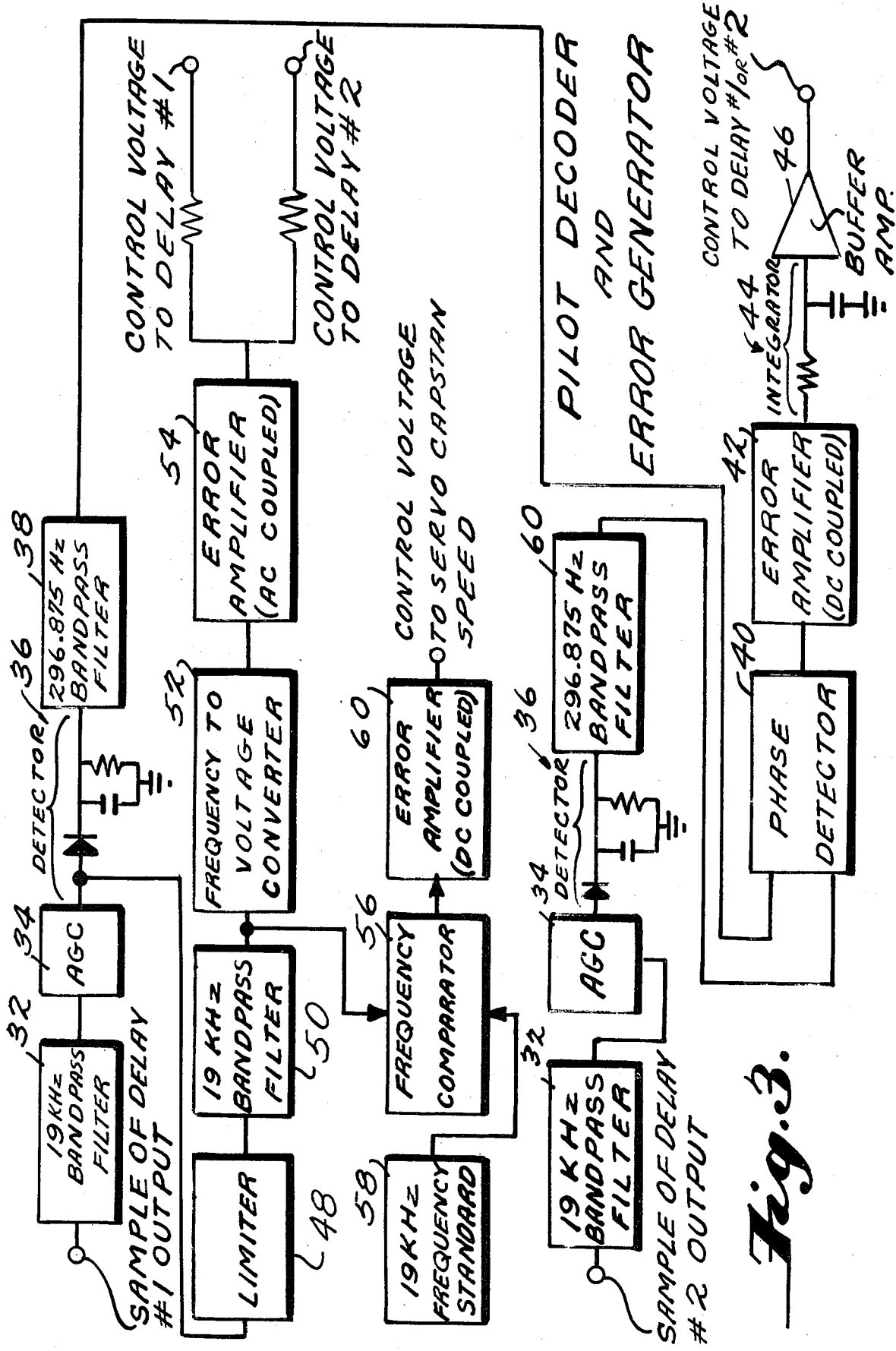
FIG. 3 is a block diagram of details of the pilot decoder and error generator forming a portion of FIG. 1.

The three distinct types of time base errors which have been mentioned (i.e., multichannel delay error, flutter and speed error) can be corrected separately or concurrently utilizing the pilot decoder and error generator 16 which is illustrated in FIG. 3. However, for convenience of presentation, the correction arrangement for each of the above three types of errors will be discussed individually.

For multichannel delay error correction, samples of the output of each of the two digital delays 14 are fed to the inputs of respective 19 kHz bandpass filters 32. These filters serve to pass the modulated pilot signal and reject the audio signal. Two automatic gain controlled (AGC) stages 34 follow which stabilize the amplitude of the pilot signal and compensate for variations in playback level. A detector, generally indicated as 36, follows each AGC. Each detector recovers the 296.875 Hz signal which is modulated onto the 19 kHz carrier. Bandpass filters 38 which reject noise follow the detectors. The two 296.875 Hz signals are fed to a phase detector 40 which produces an output voltage having a magnitude proportional to the phase difference of the two signals and a polarity dependent on which channel leads in phase. If both signals are in perfect phase, there is no output. A DC coupled error amplifier 42 follows, which in turn is followed by an integrator 44 which averages instantaneous errors, and by a buffer amplifier 46. The output of the buffer amplifier comprises a delay error negative feedback signal, and it is fed to the control voltage input of the appropriate one of the two voltage-controlled delays 14. In this way, the delay parameter of one of the two delays 14 is servoed in such a way as to reduce and minimize delay error.

It should be mentioned that a system based on a 296.875 Hz modulating frequency cannot handle a delay error of greater than 1684 microseconds, which corresponds to 180° of phase of 296.875 Hz. However, this is far greater than the 200 $\mu$s or 300 $\mu$s maximum delay error of a typical tape recorder.

For applications that require an extremely accurate delay error correction, additional circuitry could easily be added which compares the phase of the two 19 kHz carriers. In this case, two paralleled feedback loops would exist. The first would be the loop derived from the 296.875 Hz information and would bring the delay error down to less than 26 $\mu$s (180° of phase of 19 kHz), and another "fine adjustment" feedback loop derived from the phase of the 19 kHz carriers.

With respect to flutter correction, the nature of flutter is such that all channels of a multichannel device will have the same flutter error. For this reason, the pilot signal can be sampled from either (or any) of the channels, and the feedback signal can be applied to both (or all) of the channels. The circuitry begins with the 19 kHz bandpass filter 32 and the AGC stage 34 which is shared with the delay error correction circuit just described. The modulated pilot then is fed to a limiter 48 which removes the amplitude modulation and leaves only the 19 kHz carrier. This carrier then is filtered by bandpass filter 50 to remove noise and thereafter is applied to a frequency-to-voltage converter 52 which produces an output voltage proportional to the instantaneous frequency of the 19 kHz carrier. The AC component of this signal then is amplified by circuit 54 and is fed back to the control voltage inputs of both (or all) of the voltage-controlled delays 14. Such an arrangement comprises a negative feedback loop which tends to reduce instantaneous speed error (flutter) by an amount proportional to the loop gain.

When initially considered, it may be difficult to understand how a voltage-controlled delay can operate to correct instantaneous speed error. To facilitate an understanding of this, an example will be presented. Assuming a voltage-controlled delay with a 1000 Hz tone at its input, the control voltage is set to a value which causes a delay of 100 milliseconds (ms). At this constant value of delay, a 1000 Hz tone will appear at the output of the delay. However, if the control voltage is ramped smoothly upward for a period of one second, at the end of that second the absolute delay of the device is 200 ms. In other words, the delay has been increased at a rate of 100 ms/s for a period of one second. At the end of the ramp, the delay once again is stable and there is a 1000 Hz tone at both the input and output of the delay. However, during the one second ramp, the tone at the output of the delay had a frequency of 900 Hz. This is because the delay was being increased at a rate of 100 ms/s. The "lost" 100 cycles are contained in the delay unit. If the control voltage now is decreased smoothly back to 100 ms delay over a period of one second, the tone at the output will have a frequency of 1100 Hz for a period of one second.

Flutter is caused by an alternatingly increased and decreased tape speed around a center value which causes an alternatingly increased and decreased pitch (frequency) around a center value. In view of the discussion just presented, it can be seen why an AC signal impressed on the DC control voltage of a voltage-controlled delay 14 can increase and decrease the pitch of the audio coming out of the delay in a cyclic way. The feedback loop of the flutter corrector is set up in such a way that when the frequency of the 19 kHz carrier appearing at the output of the delay 14 tends to increase, a control voltage is generated that tends to increase the amount of delay which tends to decrease the frequency of the 19 kHz carrier. Since the instantaneous frequency of the 19 kHz carrier tends to be corrected, so does the audio signal as well.

In order to effect speed correction, the regenerated 19 kHz carrier obtained at the output of the previously discussed bandpass filter 50 is fed to one input of a frequency comparator 56. The other input of the comparator is connected to a 19 kHz frequency standard (crystal oscillator) 58. The output of the frequency comparator is a voltage proportional to the frequency difference between the two inputs and its polarity is determined by which frequency is higher. The output of comparator 56 is amplified by a DC coupled amplifier 60, and this DC voltage is fed to the capstan motor of the playback device 12 in such a way as to alter its speed over a given range. For example, if the 19 kHz carrier frequency tends to drift higher than the 19 kHz reference frequency, the feedback voltage tends to reduce the capstan motor speed since speed error, relative to the reference frequency, is inversely proportional to the loop gain. Also, as is obvious to a person of ordinary skill in the art, a phase comparator could be added to the frequency comparator to reduce the error to zero, relative to the reference frequency.

The foregoing discussion describes how various time base errors are corrected utilizing a system in which an inaudible pilot signal is provided at the input to the correction circuitry. However, it is apparent that to also accommodate inputs in which there is no accompanying pilot signal, the correction circuitry automatically can be electronically bypassed so that the audio information is reproduced (or transmitted) with no ill effect.

What is claimed is:

1. An arrangement for correcting time base errors in an analog audio system, comprising:
   a source of combined analog audio and inaudible encoded pilot signals supplied on separate channels, said pilot signal being a supersonic carrier which is amplitude modulated by a signal of predetermined frequency;
   voltage-controlled delay circuit means in each of said channels for delaying said signals;
   means connected to said delay circuit means for separating the respective delayed audio and pilot signals in each channel;
   means joined to said separating means for decoding the pilot signals to develop error correction signals, said decoding means including:
   (1) means for separating the supersonic carrier from its modulating signal in each channel;
   (2) a phase detector;
   (3) means for connecting the separated modulating signals in each channel to said phase detector for developing a first error correction signal as a function of the phase difference between the separated modulating signals;
   (4) a frequency-to-voltage converter; and
   (5) means for connecting the separated carrier in one channel to said converter for developing a second error correction signal as a function of the instantaneous frequency of the carrier; and
   means for applying said first error correction signal to one of said delay circuit means and said second error correction signal to the delay circuit means in each of said channels, thereby adjusting the delays thereof to effect time base corrections.

2. An arrangement as set forth in claim 1, wherein the first error correction signal has a magnitude which is a function of said phase difference and a polarity dependent on which of the separated modulating signals leads in phase.

3. An arrangement as set forth in claim 1, wherein said source is a magnetic tape playback device having a speed-controllable capstan for moving the tape, said decoding means further including:
   (1) a frequency comparator;
   (2) a source of a standard frequency signal; and
   (3) means for connecting the separated carrier and said standard frequency signal to the comparator for developing a third error correction signal as a function of the frequency difference between the carrier and said standard frequency signal; and
   means for applying said third error correction signal to the playback device to adjust the capstan speed thereby effecting an additional time base correction.

4. An arrangement as set forth in claim 3, wherein the third error correction signal has a magnitude which is a function of the frequency difference and a polarity dependent on which frequency is higher.

5. An arrangement for correcting time base errors in an analog audio system, comprising:
   a source of combined analog audio and inaudible encoded pilot signals supplied on separate channels, said pilot signal being a supersonic carrier which is amplitude modulated by a signal of predetermined frequency;

voltage-controlled delay circuit means in each of said channels for delaying said signals;

means connected to said delay circuit means for separating the respective delayed audio and pilot signals in each channel;

means joined to said separating means for decoding the pilot signals to develop an error correction signal, said decoding means including:
 (1) means for separating the supersonic carrier from its modulating signal in each channel;
 (2) a phase detector; and
 (3) means for connecting the separated modulating signals in each channel to said phase detector for developing the error correction signal as a function of the phase difference between the separated modulating signals; and means for applying said error correction signal to one of said delay circuits to adjust the delay thereof.

6. An arrangement as set forth in claim 5, wherein the error correction signal has a magnitude which is a function of said phase difference and a polarity dependent on which of the separated modulating signals leads in phase.

7. An arrangement as set forth in claim 5, wherein said source is a magnetic tape playback device having a speed-controllable capstan for moving the tape, and wherein said decoding means further comprises:
 (1) a frequency comparator;
 (2) a source of a standard frequency signal; and
 (3) means for connecting the separate carrier and said standard frequency signal to the comparator for developing a further error correction signal as a function of the frequency difference between the carrier and said standard frequency signal; and means for applying said further error correction signal to the playback device to adjust the capstan speed.

8. An arrangement as set forth in claim 7, wherein the farther error correction signal has a magnitude which is a function of the frequency difference and a polarity dependent on which frequency is higher.

* * * * *